United States Patent [19]
Van Der Heijden

[11] Patent Number: 5,933,264
[45] Date of Patent: *Aug. 3, 1999

[54] OPTICAL RECEIVER, A TUNER, AND AN OPTICAL NETWORK

[75] Inventor: Alfons A. B. Van Der Heijden, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/632,940

[22] Filed: Apr. 16, 1996

[30] Foreign Application Priority Data

Apr. 21, 1995 [EP] European Pat. Off. .............. 95201018

[51] Int. Cl.⁶ .................................................. H04B 10/06
[52] U.S. Cl. ....................... 359/189; 250/214 A; 330/59
[58] Field of Search .................................. 359/189, 152, 359/154, 125, 132; 330/34, 135, 308, 59; 250/214, 214 A; 455/60, 63; 370/30

[56] References Cited

U.S. PATENT DOCUMENTS

| | | | |
|---|---|---|---|
| 3,657,543 | 4/1972 | Rose | 359/189 |
| 5,373,152 | 12/1994 | Domon et al. | 250/214 AG |
| 5,479,286 | 12/1995 | Stalley et al. | 359/125 |
| 5,481,104 | 1/1996 | Miller et al. | 250/214 C |
| 5,485,302 | 1/1996 | Braun et al. | 359/189 |
| 5,613,210 | 3/1997 | Van Driel et al. | 455/45 |

FOREIGN PATENT DOCUMENTS

61-33018  2/1988  Japan .............................. H04B 1/18

OTHER PUBLICATIONS

John M. Senior, Optical Fiber Communications Principles and Practice, Dept. of Electrical and Electronic Engineering Manchester Polytechnic, pp. 460–472.

P.M.R.S. Moreira et al, Design and optimisation of a fully integrated GaAs tuned receiver preamplifier MMIC for optical SCM applications, IEE Proceedings–J, vol. 140, No. 6, Dec. 1993, pp. 411–415.

Toshiyuki Tsuchiya et al, Analysis and Design for Optical Video ransport/Distribution System with Video on Demand Service, Journal of Lightwave Technology, vol. 11, No. 1, Jan. 1993.

Television Tuners Coaxial Aerial Assemblies, DisplComponents Data Haook, Book DC03, Mar. 192, pp. 77–91.

*Primary Examiner*—Kinfe-Michael Negash
*Attorney, Agent, or Firm*—Daniel E. Tierney

[57] ABSTRACT

Known is an optical receiver (4) in which first a received broadband optical signal is converted to a broadband electric signal by means of a optoelectric converter (49) comprising a transimpedance amplifier, and thereafter a channel is selected from the converted broadband signal by means of a tuner which is coupled to the transimpedance amplifier. Such a configuration is not optimal in fulfilling noise and bandwidth requirements. An optical receiver (4) for subcarrier multiplexed optical signals is proposed which has a tunable frequency selective front-end section (30) that is directly coupled to a photodiode (49) as an optoelectric converter so as to selectively pass a tuned channel from the received subcarrier multiplexed optical signal to a succeeding amplifier (36; 61).

9 Claims, 3 Drawing Sheets

OPTICAL RECEIVER, A TUNER, AND AN OPTICAL NETWORK

TECHNICAL FIELD

The present invention relates to an optical receiver, a tuner, and an optical network. Such a receiver can be a receiver for receiving analog or digital signals, and can be applied in a local loop areas of a CATV-network or a telephony network, or the like. The network can be a passive optical network.

BACKGROUND OF THE INVENTION

An optical receiver of the above kind is known from the Japanese Patent Application No. 63-33018 in which a broadband satellite receiver is disclosed. An antenna signal is fed to an optoelectric converter via a glass fibre cable. A broadband output electrical signal of the converter is fed to a down-converter. A down-converter output signal is fed to a TV-tuner. In such an optical receiver configuration, in which light from the glass fibre cable is first converted to a broadband electric signal, the optoelectric converter comprises a transimpedance amplifier. A disadvantage of such a configuration is that the whole relevant frequency range is converted while only a small band is actually used, namely the tuned channel in the TV-tuner. Due to parasitic capacitance effects, the transimpedance of the transimpedance amplifier is limited to a maximum value causing this configuration to have limited noise properties. A typical noise spectral density figure is 2 to 8 pA/√Hz. On the one hand a very low noise figure is desired, and on the other hand a broad bandwidth is desired. Because of the fact that noise is proportional to the transimpedance and bandwidth is inversely proportional to the transimpedance, the noise and bandwidth requirements are conflicting in this configuration.

In the Article "Design and optimisation of a fully integrated GaAs tuned receiver preamplifier MMIC for optical SCM applications", P.M.R.S. Moreira et al, IEE Proceedings-J, Vol. 140, No. 6, Dec. 1993, pp. 411–415 a tuned receiver preamplifier is disclosed in which a subcarrier multiplexed light wave is inputted to an optoelectric converter which is coupled to a tuning network. The preamplifier operates in the GHz region. A broadband output signal of the tuning network is fed to a preamplifier and standard microwave techniques are used to select a channel from the broadband electrical output signal of the preamplifier. By applying an optimisation method that minimises a cost function, components of the tuning network are determined so as to globally maximise the SNR (Signal-to-Noise Ratio) over the complete tuning range. The input tuning network operates to reduce the input noise by providing a low input impedance path in parallel with a noise current source and a high impedance path in series with a noise voltage source. Said article thus discloses the use of a resonant noise shaping circuit operating over the whole tuning range, i.e. broadband noise tuning.

SUMMARY OF THE INVENTION

It is an object of the present invention to provide an optical receiver with optimal noise properties while allowing selection of a narrow bandwidth channel from a broadband optical signal.

To this end an optical receiver for receiving a subcarrier multiplexed optical signal is provided, which receiver comprises at least one tunable frequency selective front-end section, a front-end amplifier, and an optoelectric converter for optoelectric conversion of the optical signal, the tunable frequency selective front-end section and the optoelectric converter being directly coupled to each other so as to selectively pass a tuned channel from the subcarrier multiplexed optical signal to the front-end receiver. Herewith a very simple selective optical receiver configuration is achieved having a very low noise spectral density figure, typically a factor 10–100 lower than an optical receiver in a transimpedance configuration. The present invention is based upon the insight that the parasitic capacitances of the optoelectric converter, preferably a photodiode, are of no importance any longer because of forming part of the electrically tunable front-end section, i.e. the parasitic capacitance of the photodiode is used in the selective tuning circuit. This further implies that in principle the transimpedance value approaches infinity so that there are no bandwidth problems any longer.

In a preferred embodiment of an optical receiver according to the present invention, the optoelectric converter is a reverse biased photodiode. Herewith, the capacitance of the photodiode is minimal so that the tunable front-end section is affected to only a small extent.

The tunable frequency selective front-end section is preferably made electrically tunable by means of a varicap diode but also other variable capacitance devices can be applied such as a mechanically tunable capacitor. The tunable frequency selective front-end section can also be made tunable by means of a variable inductor device. The tunable frequency selective front-end section can be a parallel resonant circuit or a series resonant circuit, the amplifier being a high-input-impedance FET amplifier or a bipolar amplifier, respectively. The optoelectric converter can be a photodiode, a photo-transistor, or any other suitable device. The optical receiver can be integrated within a TV-tuner that can be coupled to an optical network such as a CATV-network (CAble or TeleVision network), preferably allowing interactive services.

BRIEF DESCRIPTION OF THE DRAWING

The present invention will now be described, by way of example, with reference to the accompanying drawings, wherein FIG. 1 schematically shows an optical network according to the present invention.

Throughout the figures the same reference numerals are used for the same features.

DETAILED DESCRIPTION

Figure 1:
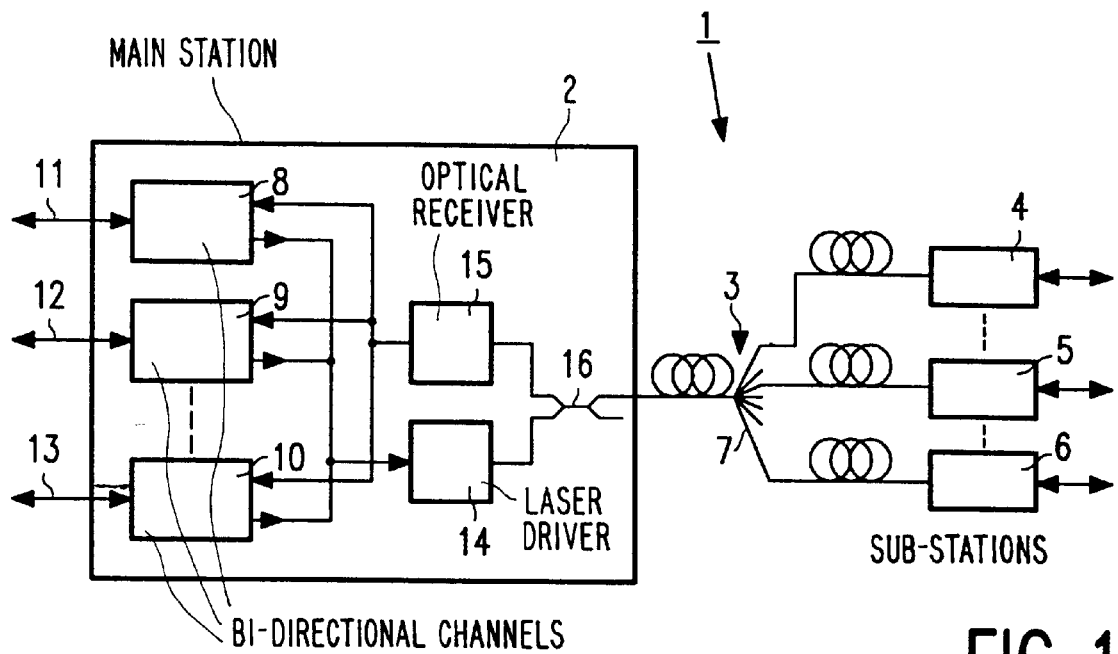

FIG. 1 schematically shows an optical network 1 according to the present invention comprising a main station 2 communicating via a passive optical network 3 of glass fibres with a plurality of substations 4, 5, and 6. The substations 4, 5, and 6 are coupled to a passive splitter 7. The main station 2 can be a head-end of a multi-media communication network such as a CATV-network allowing bidirectional communication and offering a plurality of services such as traditional CATV services, interactive TV services, Video-on-Demand, or the like, the head-end being a so-called Optical Light Termination or OLT. The main station 2 can also be a head-end of a TPON (Telephony over a Passive Optical Network). The network can also comprise light amplifiers (not shown). The substations 4, 5, and 6 can be Optical Network Units or so-called ONUs allowing bidirectional communication with the OLT. The ONUs can be ONUs to the curb, to the building, or to the home. In the given example, the network 1 is a subcarrier multiple access passive optical network wherein bit streams are modulated on separate carrier. Such a network is described in more detail in the Article "Analysis and Design for Optical Video Transport/Distribution System with Video on Demand Service", T. Tsuchiya et al., Journal of Lightwave Technology, Vol. 11, No. 1, Jan. 1993, pp. 106–115. The main station 2 can also be a local telephone exchange, the substations 4, 5, and 6 then having access to various services such as broadband telephone services, facsimile, or the like. The network 2 can also offer combined telephony and video/audio services. To this end, the main station 2 comprises a plurality of analog, and/or digital bi-directional channels 8, 9, and 10. In the given example bi-directional digital channels are shown to which bitstreams 11, 12, and 13 are supplied, respectively, but the present invention is not depending on the kind of modulation technique and the kind of signals that are applied. All subcarrier modulated channels are modulated in a laser driver 14 onto a common light wave carrier so as to form a subcarrier multiplexed signal. For allowing bi-directional communication the main station 2 further comprises a broadband optical receiver 15. The laser driver 14 and the optical receiver 15 are coupled to a 1:2 optical splitter 16.

Figure 2:
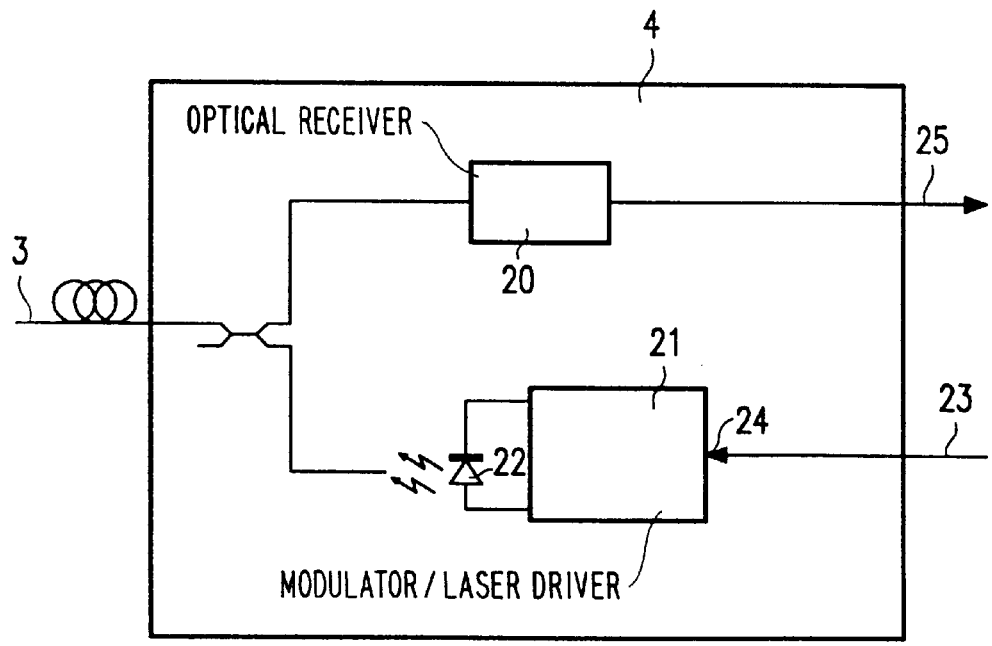
FIG. 2 shows a block diagram of a substation in a network according to the present invention.

FIG. 2 shows a block diagram of the substation 4 in the network 1 according to the present invention. The substation 4 comprises an optical receiver 20 according to the present invention, a modulator/laser driver 21 for driving a laser diode 22 with a bitstream 23 at an input 24 of the modulator/laser driver 21. A more detailed description of such a modulator/laser driver 21, which is well-known in the art, can be found in the handbook "Optical Fibre Communications", J. M. Senior, Prentice-Hall Int, Inc., London, 1985, pp. 460–463, and pp. 467–472. In the given example, the optical receiver 20 provides a demodulated datastream 25.

Figure 3:
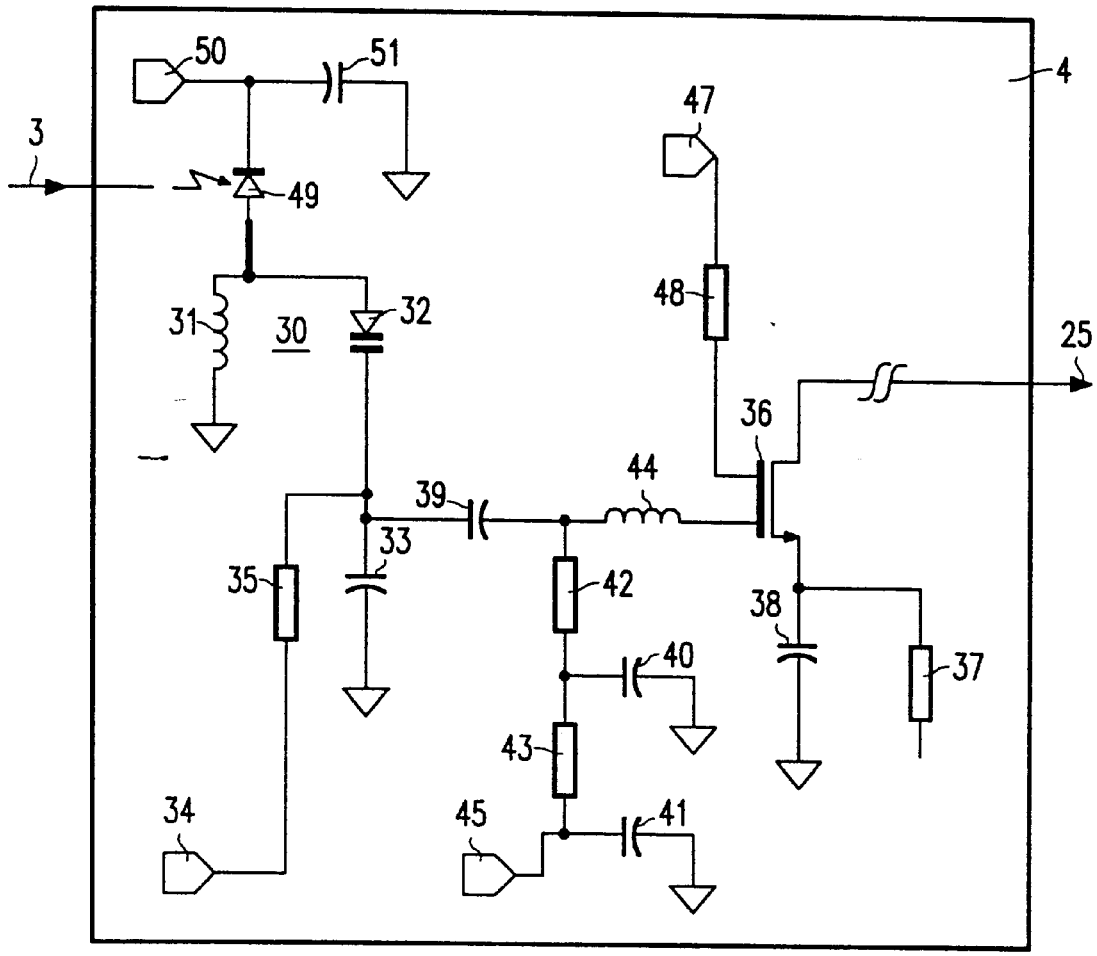
FIG. 3 shows a first embodiment of an optical receiver according to the present invention.

FIG. 3 shows a first embodiment of the optical receiver 4 according to the present invention. The optical receiver 4 comprises a tunable frequency selective front-end section 30 formed by a parallel resonant electrical circuit of an inductor 31, a varicap diode 32, and a capacitor 33. The parallel resonant electrical circuit can be electrically tuned by means of a tuning voltage to be supplied at a terminal 34 via a resistor. The bandwidth of the resonant circuit must such as to allow selection of one channel from the received subcarrier multiplexed signal from the network 3. The optical receiver 4 further comprises a front-end dual gate FET amplifier 36 with appropriate biasing and coupling elements such as the resistor 37, and the capacitor 38 to ground. A band selection network formed by capacitors 39, 40, and 41, by resistors 42, and 43, and by inductor 44 is shown, a band selection signal to be applied to a terminal 45. Further shown is a terminal 47 for supplying an AGC voltage (Automatic Gain Control) via a resistor 48 to the dual gate FET amplifier 36. To this point, the described circuit corresponds to a part of an UHF-tuner as disclosed in the datasheet of the UV815/UV816 Series TV-tuners, Data Handbook "Television Tuners", Philips Components, Book DC03, March 1992, pp. 77–91. This UHF-tuner is designed for a frequency band of 450–860 MHz. Further components of this TV-tuner as disclosed in said Handbook, namely oscillators, mixers, and IF-amplifiers are well-known. In FIG. 3, this known circuitry is indicated with an interrupted drain lead of the FET 36. The IF-signal as provided by such a tuner is fed to well-known baseband demodulation circuits. According to the present invention, the optical receiver 4 further comprises a reverse biased photodiode 49 which is directly coupled to the tunable frequency selective front-end section 30. A reverse bias voltage is supplied to the photodiode 49 via a terminal 50. An AC-decoupling capacitor 51 is connected between the terminal 50 and ground. Reverse biasing advantageously achieves that the parasitic capacitance of the photodiode 49 is as small as possible thus hardly influencing the parallel resonant circuit. Instead of an electrically tuned varicap, also a mechanically tuned capacitor (not shown) can be used. For parallel selection of more than one channel, either in the same or in another frequency band, further tunable frequency selective front-end sections and/or with further photodiodes can be applied. As such an extension is straightforward, no details are shown here.

Figure 4:
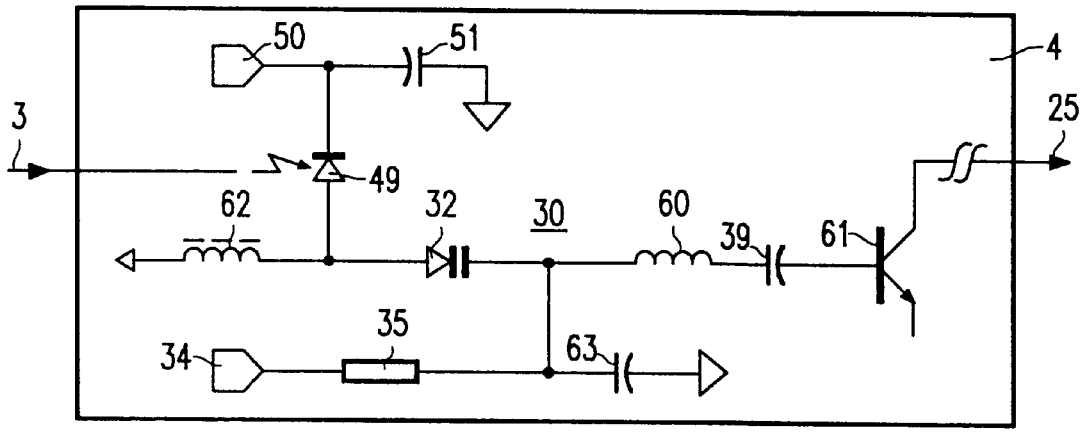
FIG. 4 shows a second embodiment of an optical receiver according to the present invention.

FIG. 4 shows a second embodiment of the optical receiver 4 according to the present invention. Instead of a parallel resonant circuit a series resonant circuit is shown, formed by the varicap diode 32, and an inductor 60. Instead of a FET a bipolar transistor 61 is applied. For DC-coupling an rf-choke 62 is provided for DC-coupling to ground. An AC-decoupling capacitor 63 is provided.

Figure 5:
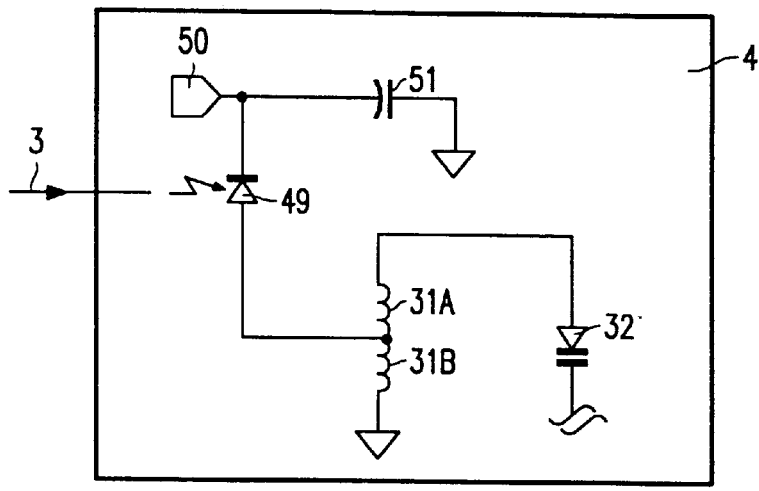
FIG. 5 shows a third embodiment of an optical receiver according to the present invention.

FIG. 5 shows a third embodiment of the optical receiver 4 according to the present invention. Instead of the inductor 31, an auto-transformer with windings 31A and 31B is provided, the photodiode 49 being coupled to a junction of the windings 31A and 31B.

Figure 6:
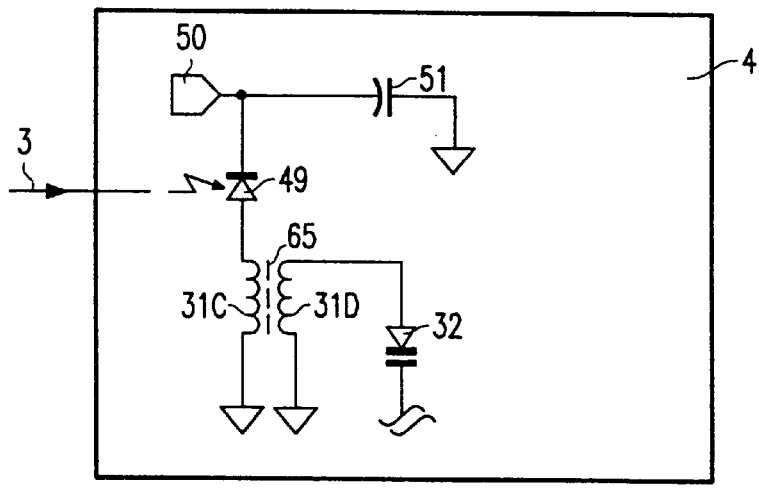
FIG. 6 shows a fourth embodiment of an optical receiver according to the present invention.

FIG. 6 shows a fourth embodiment of the optical receiver 4 according to the present invention. Instead of the inductor 31, a transformer with windings 31C and 31D is provided, the photodiode 49 being coupled to the winding 31C, and the varicap diode 32 being coupled to the winding 31D. The windings 31C and 31D can be air-coupled or can be coupled by means of a core such as a ferrite core 65.

Figure 7:
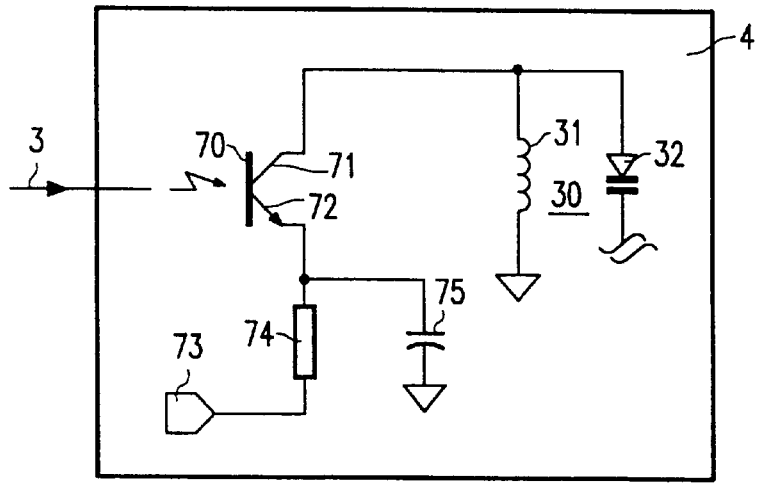
FIG. 7 shows a fifth embodiment of an optical receiver according to the present invention.

FIG. 7 shows a fifth embodiment of the optical receiver 4 according to the present invention. Instead of the photodiode 49 a photo-transistor 70 is provided, the tunable frequency selective front-end section 30 being coupled to a collector 71 of the photo-transistor 70, and an emittor 72 of the phototransistor being coupled to a terminal 73 for supply of a negative bias voltage thereto via a resistor 74, and to ground via a capacitor 75 for AC-decoupling.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. An optical receiver for receiving a subcarrier multiplexed optical signal, which receiver comprises at least one tunable frequency selective front-end section having one or more components that support at least one variable electronic property for adjusting the selection of the channel from the received subcarrier multiplexed optical signal, a front-end amplifier, and an optoelectric converter for optoelectric conversion of the optical signal, the optoelectric converter interfacing with a biasing voltage source for reducing the capacitance of the optoelectric converter, the tunable frequency selective front-end section and the optoelectric converter being directly coupled to each other so as to selectively pass a tuned channel from the subcarrier multiplexed optical signal to the front-end amplifier.

2. An optical receiver (4) according to claim 1, wherein the tunable frequency selective front-end section (30) is a parallel resonant electrical circuit (31, 32, 33), and the front-end amplifier is a FET-amplifier (36).

3. An optical receiver (4) according to claim 1, wherein the tunable frequency selective front-end section (30) is a series resonant electrical circuit (32, 60), and the front-end amplifier is a bipolar amplifier (61).

4. An optical receiver according to claim 1, wherein the optoelectric converter is a photodiode (49).

5. An optical receiver according to claim 4, wherein the photodiode is reverse biased.

6. An optical receiver according to claim 1, wherein the tunable frequency selective front-end section (30) is electrically tunable by means of at least one varicap diode (32).

7. A tuner for coupling to an optical network, which tuner comprises a tunable frequency selective front-end receiver section having one or more components that support at least one variable electronic property for adjusting the selection of the channel from the received subcarrier multiplexed optical signal, a front-end amplifier, and an optoelectric converter for optoelectric conversion of a subcarrier multiplexed optical signal received from the optical network, the optoelectric converter interfacing with a biasing voltage source for reducing the capacitance of the optoelectric converter, the tunable frequency selective front-end receiver section and the optoelectric converter being directly coupled to each other so as to selectively pass a tuned channel from the subcarrier multiplexed optical signal to the front-end amplifier.

8. An optical network comprising a main station and a plurality of substations, which substations are coupled with or comprise at least one tuner, which tuner comprises a tunable frequency selective front-end receiver section having one or more components that support at least one variable electronic property for adjusting the selection of the channel from the received subcarrier multiplexed optical signal, a front-end amplifier, and an optoelectric converter for optoelectric conversion of a subcarrier multiplexed optical signal received from the optical network, the optoelectric converter interfacing with a biasing voltage source for reducing the capacitance of the optoelectric converter, the tunable frequency selective front-end receiver section and the optoelectric converter being directly coupled to each other so as to selectively pass a tuned channel from the subcarrier multiplexed optical signal to the front-end amplifier.

9. An optical network according to claim 8, wherein the network is a passive optical network (1).

* * * * *